(12) United States Patent
Schotes et al.

(10) Patent No.: US 12,503,465 B2
(45) Date of Patent: Dec. 23, 2025

(54) PROCESS FOR PREPARING [3-CHLORO-2-[3-[2-[1-(2-CHLOROACETYL)-4-PIPERIDYL]THIAZOL-4-YL]-4,5-DIHYDROISOXAZOL-5-YL]PHENYL] METHANESULFONATE

(71) Applicant: Bayer Aktiengesellschaft, Leverkusen (DE)

(72) Inventors: Christoph Schotes, Duesseldorf (DE); Marjorie Daniele Bernadet Massel, Cologne (DE); Matthias Riedrich, Cologne (DE)

(73) Assignee: BAYER AKTIENGESELLSCHAFT, Leverkusen (DE)

( * ) Notice: Subject to any disclaimer, the term of this patent is extended or adjusted under 35 U.S.C. 154(b) by 742 days.

(21) Appl. No.: 17/787,273

(22) PCT Filed: Dec. 16, 2020

(86) PCT No.: PCT/EP2020/086428
§ 371 (c)(1),
(2) Date: Jun. 17, 2022

(87) PCT Pub. No.: WO2021/122752
PCT Pub. Date: Jun. 24, 2021

(65) Prior Publication Data
US 2023/0031599 A1      Feb. 2, 2023

(30) Foreign Application Priority Data
Dec. 19, 2019   (EP) ................................... 19217876

(51) Int. Cl.
*C07D 417/14* (2006.01)
(52) U.S. Cl.
CPC .................................. *C07D 417/14* (2013.01)

(58) Field of Classification Search
None
See application file for complete search history.

(56) References Cited

U.S. PATENT DOCUMENTS

| | | |
|---|---|---|
| 9,006,266 B2 | 4/2015 | Tsuchiya |
| 9,150,565 B2 | 10/2015 | Tsuchiya |
| 9,434,723 B2 | 9/2016 | Tsuchiya |
| 9,770,027 B2 | 9/2017 | Tsuchiya |
| 9,930,890 B2 | 4/2018 | Tsuchiya |
| 10,336,742 B2 | 7/2019 | Homberger et al. |
| 10,499,641 B2 | 12/2019 | Tsuchiya et al. |
| 2012/0122929 A1 | 5/2012 | Tsuchiya |
| 2013/0296272 A1 | 11/2013 | Tsuchiya |
| 2014/0206646 A1 | 7/2014 | Tsuchiya |
| 2015/0175598 A1 | 6/2015 | Tsuchiya |
| 2015/0351403 A1 | 12/2015 | Tsuchiya |
| 2016/0309719 A1 | 10/2016 | Tsuchiya |
| 2017/0240541 A1 | 8/2017 | Homberger et al. |
| 2018/0007903 A1 | 1/2018 | Tsuchiya |

FOREIGN PATENT DOCUMENTS

| | | |
|---|---|---|
| WO | 2008/013622 A2 | 1/2008 |
| WO | 2008013925 A2 | 1/2008 |
| WO | 2012/025557 A1 | 3/2012 |
| WO | 2015/181097 A1 | 12/2015 |

OTHER PUBLICATIONS

International Search Report received in international application No. PCT/EP2020/086428, mailed Mar. 15, 2021.
Wang, Liang-Liang, et al. "Design and synthesis of aminothiazolyl norfloxacin analogues as potential antimicrobial agents and their biological evaluation" European Journal of Medicinal Chemistry, vol. 167, pp. 105-123, Feb. 2019.

*Primary Examiner* — Po-Chih Chen
(74) *Attorney, Agent, or Firm* — Michael Vanengelen

(57) ABSTRACT

The present invention relates to a process for preparing [3-chloro-2-[3-[2-[1-(2-chloroacetyl)-4-piperidyl]thiazol-4-yl]-4,5-dihydroisoxazol-5-yl]phenyl] methanesulfonate.

15 Claims, No Drawings

PROCESS FOR PREPARING [3-CHLORO-2-[3-[2-[1-(2-CHLOROACETYL)-4-PIPERIDYL]THIAZOL-4-YL]-4,5-DIHYDRO-ISOXAZOL-5-YL]PHENYL] METHANESULFONATE

CROSS-REFERENCE TO RELATED APPLICATIONS

This application is the National Stage entry of International Application No. PCT/EP2020/086428, filed 16 Dec. 2020, which claims priority to European Patent Application No. 19217876.2, filed 19 Dec. 2019.

BACKGROUND

Field

Description of Related Art

The present invention relates to a process for preparing [3-chloro-2-[3-[2-[1-(2-chloroacetyl)-4-piperidyl]thiazol-4-yl]-4,5-dihydroisoxazol-5-yl]phenyl] methanesulfonate.

[3-chloro-2-[3-[2-[1-(2-chloroacetyl)-4-piperidyl]thiazol-4-yl]-4,5-dihydroisoxazol-5-yl]phenyl]methanesulfonate is an intermediate of fluoxapiprolin, which is a fungicide for control of oomycetes known from WO 2012/025557.

WO 2015/181097 discloses a process for preparing [3-chloro-2-[3-[2-[1-(2-chloroacetyl)-4-piperidyl]thiazol-4-yl]-4,5-dihydroisoxazol-5-yl]phenyl] methanesulfonate (compound of the formula (D)) via a chloroacetyl-substituted compound of the formula (II), which is reacted with piperidine-4-carbothioamide (III) in presence of hydrochloric acid and ethanol in a Hantzsch reaction to give a piperidinium salt of the formula (IV). The piperidinium salt of the formula (IV) is then converted to the compound of the formula (I) by reaction with chloroacetylchloride in presence of tributylamine and tetrahydrofuran as solvent (see Scheme 1).

Scheme 1

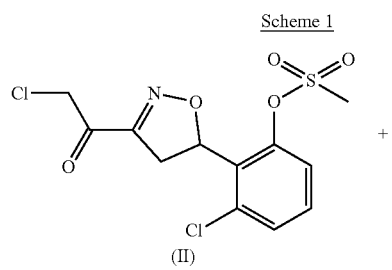

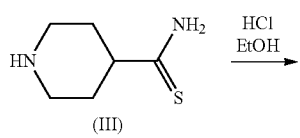

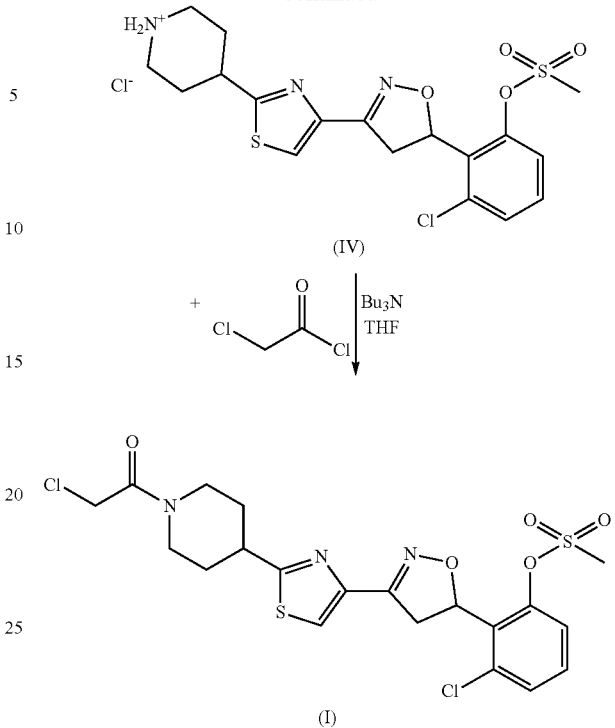

The known process has several disadvantages and is therefore not suitable for use on an industrial scale. Firstly, the process involves filtration of the piperidinium chloride intermediate of formula (IV) to allow a solvent exchange from alcoholic to aprotic solvent, which requires filtration equipment and large amounts of solvent and leads to partial loss of said intermediate via the filtrate. Secondly, the tributylamine base used in the second step has to be removed from the organic phase by exhaustive protonation with hydrochloric acid in the quench of the reaction. Otherwise the desired product (compound of formula (I)) would be hindered from crystallizing out sufficiently. The recycling of the tributylamine would then however require neutralization of the previously formed tributylammonium salt solution to set the tributylamine free again. Consequently, the known process produces a lot of waste. Thirdly, the strong base tributylamine has to be dosed in parallel to chloroacetyl chloride to limit its detrimental effect on the latter, which complicates the operation of the production.

The coupling of an acid chloride with a cyclic secondary amine in the presence of an organic base, such as triethylamine, N,N-diisopropylamine or pyridine, is also known from WO 2008/013622.

SUMMARY

In the light of the prior art described above, it is an object of the present invention to provide an improved process for the preparation of [3-chloro-2-[3-[2-[1-(2-chloroacetyl)-4-piperidyl]thiazol-4-yl]-4,5-dihydroisoxazol-5-yl]phenyl] methanesulfonate. In particular, the process should be suitable for larger scale production and produce less waste.

The object described above was achieved by a process for preparing a compound of the formula (I)

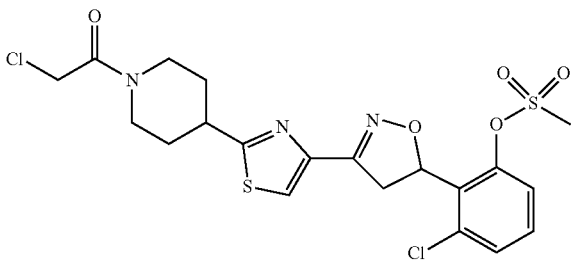

comprising the steps of
(a) reacting a compound of the formula (II)

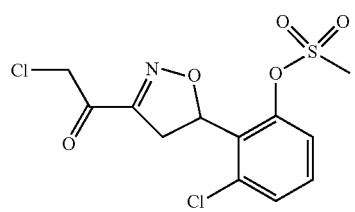

with a compound of the formula (III)

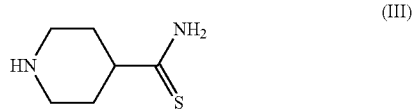

in presence of hydrogen chloride and an alcoholic solvent to give a hydrochloride salt of the formula (IV)

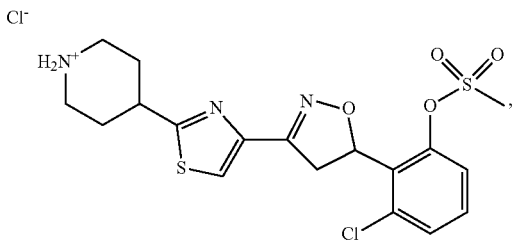

and
(b) reacting the hydrochloride salt of the formula (IV) with chloroacetyl chloride in presence of a pyridine base, an aprotic solvent and an aromatic solvent having a boiling point of at least 160° C. to give the compound of the formula (I),
wherein between steps (a) and (b) the alcoholic solvent is removed by distillation.

DETAILED DESCRIPTION OF A PREFERRED EMBODIMENT

It has been surprisingly found that by means of the process according to the invention, filtration of the piperidinium chloride salt intermediate can be avoided and the amount of waste produced can significantly be reduced. The pyridine base allows for an almost complete distillative removal of the alcoholic solvent before the addition of the aprotic solvent used in the second step. Furthermore, additional use of hydrochloric acid for protonation can be greatly reduced or avoided completely. Thus, the amount of base required for the neutralization of the pyridine base can be limited to the amount of hydrogen chloride generated in the chemical reaction.

In step (a) of the process according to the invention, the compound of formula (II) is reacted with the compound of formula (III) in presence of hydrogen chloride and an alcoholic solvent to give the hydrochloride salt of formula (IV).

Suitable alcoholic solvents are methanol, ethanol, n-propanol (propanol), iso-propanol, n-butanol (butanol), iso-butanol, sec-butanol and tert-butanol. Preferred alcoholic solvents are isopropanol and ethanol. Most preferred is ethanol.

Preferably, the hydrogen chloride is used in form of hydrochloric acid, more preferably hydrochloric acid having a HCl concentration of at least 20 wt. %, more preferably at least 30 wt. %, and in particular at least 35 wt. %.

The reaction according to step (a) is effected at temperatures of −20° C. to +120° C., preferably at temperatures of 20° C. to +100° C., more preferably at 40° C. to 80° C. under standard pressure.

Preferably, the compound of formula (III) is first converted to the corresponding hydrochloride in presence of the alcoholic solvent, before the compound of formula (II) is added.

The amount of hydrogen chloride used in step (a) is preferably within the range of from 1 mol to 3 mol, more preferably 1 mol to 2 mol, and most preferably 1 mol to 1.5 mol per 1 mol of the compound of formula (II).

The amount of the compound of formula (III) used in step (a) is preferably within the range of from 1 mol to 3 mol, more preferably 1 mol to 2 mol, and most preferably 1 mol to 1.5 mol per 1 mol of the compound of formula (II).

The reaction time is not critical and may, according to the batch size and temperature, be selected within a range between a few minutes and several hours. A suitable reaction time is for example between 2 h and 10 h.

In step (b) of the process according to the invention, the hydrochloride salt of the formula (IV) is reacted with chloroacetyl chloride in presence of a pyridine base, an aprotic solvent and an aromatic solvent having a boiling point of at least 160° C. to give the compound of the formula (I).

The amount of chloroacetyl chloride used in step (b) is preferably within the range of from 1 mol to 5 mol, more preferably 1.5 mol to 4 mol, and most preferably 1.5 mol to 2.5 mol per 1 mol of the compound of formula (IV).

The reaction according to step (b) is preferably effected at temperatures of 0° C. to +120° C., more preferably at temperatures of 20° C. to 80° C., most preferably at 30° C. to 60° C. under standard pressure.

The reaction time is not critical and may, according to the batch size and temperature, be selected within a range between a few minutes and several hours. A suitable reaction time is for example between 1 h and 5 h.

Preferably, the pyridine base is an alkyl pyridine base.

Suitable alkyl pyridines which can be employed in the process according to the invention include the collidines, lutadines, picolines, the methylethyl pyridines, the diethyl pyridines, 2-isopropylpyridine, 2-propylpyridine, 2-methyl- 3-propylpyridine, 2-ethyl-5-propylpyridine, 2-methyl-5-tert-butylpyridine, 2-ethyl-3-amylpyridine, 2-decylpyridine and 2-butyl-5-octylpyridine.

Preferred pyridine bases are selected from the picolines, lutidines, collidines, methylethyl pyridines and diethyl pyridines. Most preferred is 2-methyl-5-ethyl-pyridine.

The amount of pyridine base used is preferably within the range of from 1 mol to 20 mol, more preferably 2 mol to 10 mol, and most preferably 3 mol to 6 mol per 1 mol of the compound of formula (IV).

Preferably, the aprotic solvent used in step (b) comprises a polar aprotic solvent.

Suitable polar aprotic solvents are ethers such as diethyl ether, methyl tert-butyl ether, dibutyl ether, ethylenglycoldimethylether, diethylenglycoldimethylether, methyltetrahydrofuran, tetrahydrofuran and 1,4-dioxane, ketones such as acetone, methyl ethyl ketone, methyl isopropyl ketone and methyl isobutyl ketone, esters such as methyl acetate, ethyl acetate and butyl acetate, nitriles, for example acetonitrile, propionitrile and butyronitrile, amides, for example dimethylformamide, dimethylacetamide and N-methylpyrrolidone, dimethyl sulphoxide, tetramethylenesulphone, hexamethylphosphoramide and DMPU.

Especially preferred is acetonitrile.

Suitable aromatic solvents having a boiling point of at least 160° C. which can be employed in the process according to the invention include 1,3,5-trimethylbenzene (mesitylene), 1,2,3-trimethylbenzene, 1,2,4-trimethylbenzene, 1,2-dichlorobenzene, 1,3-dichlorobenzene, 1,4-dichlorobenzene, 1,2-dimethoxybenzene (veratrole), 1,3-dimethoxybenzene, 1,4-dimethoxybenzene, and mixtures thereof. The aprotic solvent and the aromatic solvent having a boiling point of at least 160° C. are preferably used in a ratio by weight of from 10:1 to 1:5, more preferably 5:1 to 1:2, and most preferably 3:1 to 1:1.

Preferably, the aromatic solvent having a boiling point of at least 160° C. is mesitylene. Polar aprotic solvent and mesitylene are preferably used in a ratio by weight of from 10:1 to 1:5, more preferably 5:1 to 1:2, and most preferably 3:1 to 1:1.

Preferably, the solvent is changed between steps (a) and (b) from alcoholic solvent to aprotic solvent without any filtration method, in particular by distillation. Preferably, at least 95 wt. %, more preferably at least 97% wt. %, in particular at least 99 wt. % of the alcoholic solvent are removed by said distillation. If hydrochloric acid is used in step (a), which is preferred according to the invention, part of the water from the hydrochloric acid, preferably at least 90 wt. %, more preferably at least 95 wt. %, most preferably at least 98% of the water from the hydrochloric acid, is also removed by said distillation.

Preferably, at least part of the pyridine base and at least part of the aromatic solvent having a boiling point of at least 160° C., preferably mesitylene, are added prior to the distillation of the alcoholic solvent.

Preferably, the compound of the formula (IV) is used in step (b) without prior isolation, e.g. by filtration.

In a preferred embodiment of the process according to the invention, the alcoholic solvent used in step (a) is ethanol, the pyridine base is 2-methyl-5-ethyl-pyridine, the aprotic solvent used in step (b) is acetonitrile and the aromatic solvent having a boiling point of at least 160° C. used in step (b) is mesitylene.

In this embodiment, acetonitrile and mesitylene are preferably used in a ratio by weight of from 10:1 to 1:5, more preferably 5:1 to 1:2, and most preferably 3:1 to 1:1.

Preferably, at the end of the reaction according to step (b), the reaction is stopped (quenched) by means of another solvent exchange. The main portion of the solvent is preferably changed back from aprotic solvent to alcoholic solvent, wherein the alcoholic solvent used for the quench is preferably selected from ethanol, 1-butanol and 2-butanol, particularly preferred is ethanol. Said solvent exchange may be conducted by (i) distilling off a main portion of the aprotic solvent, preferably acetonitrile, and (ii) addition of an alcoholic solvent, preferably selected from ethanol, 1-butanol and 2-butanol, more preferably ethanol.

Preferably, at the end of the reaction according to step (b), the acetonitrile is removed by distillation and recycled, and the ethanol distillate obtained during the solvent exchange between steps (a) and (b) is re-used for the quench of the reaction giving the compound of formula (I). The compound of formula (I) can then be filtered off, washed with water and dried.

The present invention also relates to a process for preparing fluoxapiprolin comprising the process for preparing the compound of the formula (I) according to the invention, and further comprising step (c) reacting the compound of the formula (I) obtained in step (b) with 3,5-bis(difluoromethyl)-1H-pyrazole.

The invention is illustrated by the following examples:

EXAMPLE 1

32.8 g of piperidine-4-carbothioamide (226 mmol, 1.2 equiv) are stirred together with 221 g of ethanol at room temperature. 24.1 g of concentrated HCl (37% in water) are added thereto at room temperature. After stirring for 10 min, 70 g of 3-chloro-2-[3-(chloroacetyl)-4,5-dihydro-1,2-oxazol-5-yl]phenyl methanesulfonate (188 mmol, 1.0 equiv) are added. The mixture is heated to reflux and stirred under these conditions for 5 h.

120 g of mesitylene and 91.1 g (772 mmol, 4.0 equiv) of 2-methyl-5-ethyl-pyridine are added. The majority of ethanol is distilled off over a vigreux column under a gradually reducing vacuum. The distillation is stopped after 247 g of distillate have been obtained.

250 g of acetonitrile are added and another 82 g of distillate are distilled of at 450 mbar. The inner temperature is adjusted to 40° C. and 42 g (368 mmol, 1.96 equiv) of chloroacetylchloride are added during 3 h.

132 g of acetonitrile are distilled off at 250 mbar. 242 g of technical ethanol are added and the temperature is reduced to 0° C. After stirring overnight, the suspension is filtered, washed with 400 g of water and dried to obtain 84 g of [3-chloro-2-[3-[2-[1-(2-chloroacetyl)-4-piperidyl]thiazol-4-yl]-4,5-dihydroisoxazol-5-yl]phenyl] methanesulfonate (94.0% purity, 81.0% yield).

EXAMPLE 2

32.8 g of piperidine-4-carbothioamide (226 mmol, 1.2 equiv) are stirred together with 221 g of ethanol at room temperature. 24.1 g of concentrated HCl (37% in water) are added thereto at room temperature. After stirring for 10 min, 70 g of 3-chloro-2-[3-(chloroacetyl)-4,5-dihydro-1,2-oxazol-5-yl]phenyl methanesulfonate (188 mmol, 1.0 equiv) are added. The mixture is heated to reflux and stirred under these conditions for 5 h.

120 g of mesitylene and 91.1 g (772 mmol, 4.0 equiv) of 2-methyl-5-ethyl-pyridine are added. The majority of ethanol is distilled off over a vigreux column under a gradually reducing vacuum. The distillation is stopped after 233 g of distillate have been obtained.

250 g of acetonitrile are added and another 82 g of distillate are distilled of at 450 mbar. The inner temperature is adjusted to 40° C. and 42 g (368 mmol, 1.96 equiv) of chloroacetylchloride are added during 3 h.

133 g of acetonitrile are distilled off at 250 mbar. 231 g of technical ethanol are added and the temperature is reduced to 0° C. After stirring overnight, the suspension is filtered and washed with a combination of the $2^{nd}$ distillate (33 g) and 30 g of ethanol. The filter cake is washed with 60 g of water and dried to obtain 83.6 g of [3-chloro-2-[3-[2-[1-(2-chloroacetyl)-4-piperidyl]thiazol-4-yl]-4,5-dihydroisoxazol-5-yl]phenyl]methanesulfonate (94.8% purity, 81.3% yield).

EXAMPLE 3

32.8 g of piperidine-4-carbothioamide (226 mmol, 1.2 equiv) are stirred together with 221 g of ethanol at room temperature. 24.1 g of concentrated HCl (37% in water) are added thereto at room temperature. After stirring for 10 min, 70 g of 3-chloro-2-[3-(chloroacetyl)-4,5-dihydro-1,2-oxazol-5-yl]phenyl methanesulfonate (188 mmol, 1.0 equiv) are added. The mixture is heated to reflux and stirred under these conditions for 5 h.

120 g of mesitylene and 91.1 g (772 mmol, 4.0 equiv) of 2-methyl-5-ethyl-pyridine (recycled from previous batches) are added. The majority of ethanol is distilled off over a vigreux column under a gradually reducing vacuum. The distillation is stopped after 247 g of distillate have been obtained.

250 g of acetonitrile (recycled from previous batches) are added and another 81 g of distillate are distilled of at 450 mbar. The inner temperature is adjusted to 40° C. and 42 g (368 mmol, 1.96 equiv) of chloroacetylchloride are added during 3 h.

Roughly 130 g of acetonitrile are distilled off at 250 mbar. 244 g of technical ethanol are added and the temperature is reduced to 0° C. After stirring overnight, the suspension is filtered and washed 150 g of 2-butanol. The filter cake is washed with 400 g of water and dried to obtain 86.8 g of [3-chloro-2-[3-[2-[1-(2-chloroacetyl)-4-piperidyl]thiazol-4-yl]-4,5-dihydroisoxazol-5-yl]phenyl] methanesulfonate (95.3% purity, 84.8% yield).

EXAMPLE 4

32.8 g of piperidine-4-carbothioamide (226 mmol, 1.2 equiv) are stirred together with 221 g of ethanol at room temperature. 24.1 g of concentrated HCl (37% in water) are added thereto at room temperature. After stirring for 10 min, 70 g of 3-chloro-2-[3-(chloroacetyl)-4,5-dihydro-1,2-oxazol-5-yl]phenyl methanesulfonate (188 mmol, 1.0 equiv) are added. The mixture is heated to reflux and stirred under these conditions for 5 h.

120 g of mesitylene and 91.1 g (772 mmol, 4.0 equiv) of 2-methyl-5-ethyl-pyridine are added. The majority of ethanol is distilled off over a vigreux column under a gradually reducing vacuum. The distillation is stopped after 241 g of distillate have been obtained.

200 g of acetonitrile are added and another 33 g of distillate are distilled of at 450 mbar. The inner temperature is adjusted to 40° C. and 42 g (368 mmol, 1.96 equiv) of chloroacetylchloride are added during 3 h.

135 g of acetonitrile are distilled off at 250 mbar. 241 g of technical ethanol are added and the temperature is reduced to 0° C. After stirring overnight, 17.1 g of HCl (20% in water; 0.5 equiv) are added and stirring is continued for 2 h. The suspension is filtered and washed with a combination of the $2^{nd}$ distillate (33 g) and 30 g of ethanol. The filter cake is washed with 60 g of water and dried to obtain 82.1 g of [3-chloro-2-[3-[2-[1-(2-chloroacetyl)-4-piperidyl]thiazol-4-yl]-4,5-dihydroisoxazol-5-yl]phenyl] methanesulfonate (95.2% purity, 80.2% yield).

EXAMPLE 5

32.8 g of piperidine-4-carbothioamide (226 mmol, 1.2 equiv) are stirred together with 221 g of ethanol at room temperature. 24.1 g of concentrated HCl (37% in water) are added thereto at room temperature. After stirring for 10 min, 70 g of 3-chloro-2-[3-(chloroacetyl)-4,5-dihydro-1,2-oxazol-5-yl]phenyl methanesulfonate (188 mmol, 1.0 equiv) are added. The mixture is heated to reflux and stirred under these conditions for 5 h.

120 g of mesitylene and 91.1 g (772 mmol, 4.0 equiv) of 2-methyl-5-ethyl-pyridine are added. The majority of ethanol is distilled off over a vigreux column under a gradually reducing vacuum. The distillation is stopped after 253 g of distillate have been obtained.

255 g of acetonitrile are added and another 89 g of distillate are distilled of at 450 mbar. The inner temperature is adjusted to 40° C. and 42 g (368 mmol, 1.96 equiv) of chloroacetylchloride are added during 3 h.

127 g of acetonitrile are distilled off at 250 mbar. 253 g of technical ethanol are added and the temperature is reduced to 0° C. After stirring overnight, 150 g of water are added and stirring is continued for 2 h. The suspension is filtered and washed with a combination of 78:22 w/w acetonitrile/ethanol (30 g) and 50 g of ethanol. The filter cake is washed with 60 g of water and dried to obtain 81.6 g of [3-chloro-2-[3-[2-[1-(2-chloroacetyl)-4-piperidyl]thiazol-4-yl]-4,5-dihydroisoxazol-5-yl]phenyl] methanesulfonate (93.8% purity, 78.5% yield).

EXAMPLE 6

32.8 g of piperidine-4-carbothioamide (226 mmol, 1.2 equiv) are stirred together with 221 g of ethanol at room temperature. 24.1 g of concentrated HCl (37% in water) are added thereto at room temperature. After stirring for 10 min, 70 g of 3-chloro-2-[3-(chloroacetyl)-4,5-dihydro-1,2-oxazol-5-yl]phenyl methanesulfonate (188 mmol, 1.0 equiv) are added. The mixture is heated to reflux and stirred under these conditions for 5 h.

120 g of mesitylene and 91.1 g (772 mmol, 4.0 equiv) of 2-methyl-5-ethyl-pyridine are added. The majority of ethanol is distilled off over a vigreux column under a gradually reducing vacuum. The distillation is stopped after 242 g of distillate have been obtained.

250 g of acetonitrile are added and another 83 g of distillate are distilled of at 450 mbar. The inner temperature is adjusted to 40° C. and 42 g (368 mmol, 1.96 equiv) of chloroacetylchloride are added during 3 h.

131 g of acetonitrile are distilled off at 250 mbar. 121 g of technical ethanol are added and the temperature is reduced to 0° C. After stirring overnight, 100 g of water are added and stirring is continued for 2 h. The suspension is filtered and washed with a combination of 78:22 w/w acetonitrile/ethanol (30 g) and 50 g of ethanol. The filter cake is washed with 60 g of water and dried to obtain 87.3 g of [3-chloro-2-[3-[2-[1-(2-chloroacetyl)-4-piperidyl]thiazol-4-yl]-4,5-dihydroisoxazol-5-yl]phenyl] methanesulfonate (95.7% purity, 85.7% yield).

EXAMPLE 7

234.3 g of piperidine-4-carbothioamide (1.61 mol, 1.2 equiv) are stirred together with 2250 g of ethanol at room temperature. 172.2 g of concentrated HCl (37% in water) are added thereto at room temperature. After stirring for 10 min, 500 g of 3-chloro-2-[3-(chloroacetyl)-4,5-dihydro-1,2-oxazol-5-yl]phenyl methanesulfonate (1.34 mmol, 1.0 equiv) are added. The mixture is heated to reflux and stirred under these conditions for 5 h.

862.5 g of mesitylene and 651.5 g (5.37 mmol, 4.0 equiv) of 2-methyl-5-ethyl-pyridine are added. The majority of ethanol is distilled off over a packed column under a gradually reducing vacuum. The distillation is stopped after 2438 g of distillate have been obtained.

1429 g of acetonitrile are added and another 223 g of distillate are distilled of at 450 mbar. The inner temperature is adjusted to 40° C. and 301 g (2.63 mmol, 1.96 equiv) of chloroacetylchloride are added during 3 h.

1168 g of acetonitrile are distilled off at 250 mbar. 1285 g of 2-butanol are added and mixture is transferred to a second reactor containing 3200 g of water and 424 g of concentrated hydrochlorid acid at 5° C. The temperature of the whole mixture is adjusted to 5° C. After stirring overnight, the suspension is filtered and the filter cake washed twice with 2-butanol and twice with water. After drying, 607 g of [3-chloro-2-[3-[2-[1-(2-chloroacetyl)-4-piperidyl]thiazol-4-yl]-4,5-dihydroisoxazol-5-yl]phenyl] methanesulfonate (94.8% purity, 82.6% yield) are obtained.

EXAMPLE 8

34.6 g of piperidine-4-carbothioamide (232 mmol, 1.2 equiv) are stirred together with 315 g of ethanol at room temperature. 24.7 g of concentrated HCl (37% in water) are added thereto at room temperature. After stirring for 10 min, 70 g of 3-chloro-2-[3-(chloroacetyl)-4,5-dihydro-1,2-oxazol-5-yl]phenyl methanesulfonate (193 mmol, 1.0 equiv) are added. The mixture is heated to reflux and stirred under these conditions for 5 h.

120 g of mesitylene and 93.5 g (772 mmol, 4.0 equiv) of 2-methyl-5-ethyl-pyridine are added. The majority of ethanol is distilled off over a vigreux column under a gradually reducing vacuum. The distillation is stopped after 339 g of distillate have been obtained.

250 g of acetonitrile are added and another 88 g of distillate are distilled of at 450 mbar. The inner temperature is adjusted to 40° C. and 43.2 g (368 mmol, 1.96 equiv) of chloroacetylchloride are added during 3 h.

137.6 g of acetonitrile are distilled off at 250 mbar. 180 g of 1-butanol are added and mixture is transferred to a second reactor containing 450 g of water and 60.9 g of concentrated hydrochlorid acid at 5° C. The temperature of the whole mixture is adjusted to 5° C. After stirring overnight, the suspension is filtered and the filter cake washed twice with water. After drying, 92.2 g of [3-chloro-2-[3-[2-[1-(2-chloroacetyl)-4-piperidyl]thiazol-4-yl]-4,5-dihydroisoxazol-5-yl]phenyl] methanesulfonate (90.3% purity, 83.2% yield) are obtained.

The invention claimed is:

1. A process for preparing a compound of formula (I)

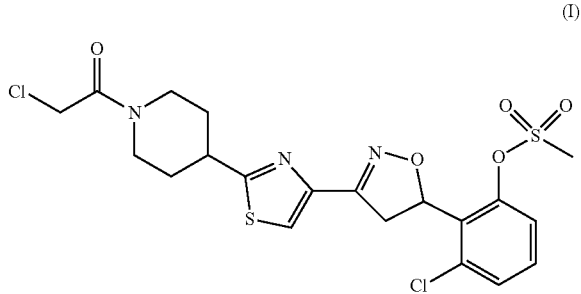 [SMILES: CS(=O)(=O)Oc1cccc(Cl)c1C1CC(c2csc(C3CCN(C(=O)CCl)CC3)n2)=NO1]

(I)

comprising
(a) reacting a compound of formula (II)

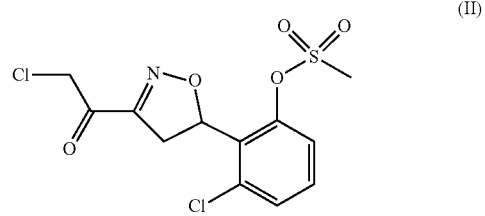 [SMILES: CS(=O)(=O)Oc1cccc(Cl)c1C1CC(C(=O)CCl)=NO1]

(II)

with a compound of formula (III)

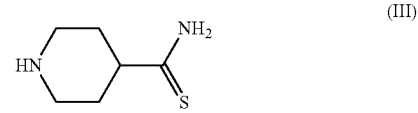

(III)

in presence of hydrogen chloride and an alcoholic solvent to give a hydrochloride salt of formula (IV)

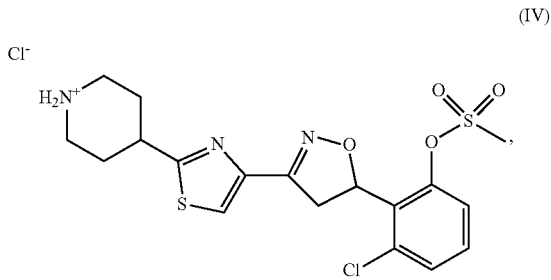 [SMILES: [Cl-] ; CS(=O)(=O)Oc1cccc(Cl)c1C1CC(c2csc(C3CC[NH2+]CC3)n2)=NO1]

(IV)

and
(b) reacting the hydrochloride salt of formula (IV) with chloroacetyl chloride in presence of a pyridine base, an aprotic solvent and an aromatic solvent having a boiling point of at least 160° C. to give the compound of formula (I),
wherein between (a) and (b) the alcoholic solvent is removed by distillation.

2. The process according to claim 1, wherein the pyridine base is an alkyl pyridine base.

3. The process according to claim 1, wherein the pyridine base is selected from picolines, lutidines, collidines, methylethyl pyridines and diethyl pyridines.

4. The process according to claim 1, wherein the pyridine base is 2-methyl-5-ethyl-pyridine.

5. The process according to claim 1, wherein the alcoholic solvent used in step (a) is ethanol.

6. The process according to claim 1, wherein the hydrogen chloride is used in form of hydrochloric acid.

7. The process according to claim 1, wherein the aprotic solvent used in (b) is a polar aprotic solvent.

8. The process according to claim 1, wherein the aprotic solvent used in (b) is acetonitrile.

9. The process according to claim 1, wherein the aromatic solvent having the boiling point of at least 160° C. is selected from the group consisting of 1,3,5-trimethylbenzene (mesitylene), 1,2,3-trimethylbenzene, 1,2,4-trimethylbenzene, 1,2-dichlorobenzene, 1,3-dichlorobenzene, 1,4-dichlorobenzene, 1,2-dimethoxybenzene (veratrole), 1,3-dimethoxybenzene, 1,4-dimethoxybenzene, and mixtures thereof.

10. The process according to claim 1, wherein the aromatic solvent having the boiling point of at least 160° C. is mesitylene.

11. The process according to claim 1, wherein the alcoholic solvent is ethanol, the pyridine base is 2-methyl-5-ethyl-pyridine and wherein in step (b) the aprotic solvent is acetonitrile and (b) is conducted in presence of mesitylene.

12. The process according to claim 1, wherein between (a) and (b) the solvent is changed from alcoholic solvent to aprotic solvent without any filtration method.

13. The process according to claim 11, wherein at an end of the reaction according to (b), the reaction is quenched by (i) distilling off about half or more, by weight, of the acetonitrile and (ii) addition of ethanol, 1-butanol or 2-butanol.

14. The process according to claim 11, wherein the ethanol used in (a) is removed by distillation and re-used in (b) for a quench of the reaction giving the compound of formula (I), and wherein the acetonitrile used in (b) is also recycled.

15. A process for preparing fluoxapiprolin comprising the process according to claim 1, and further comprising (c) reacting the compound of formula (I) obtained in (b) with 3,5-bis(difluoromethyl)-1H-pyrazole.

* * * * *